Dec. 15, 1942. G. WILDERS ET AL 2,305,335
STRAIGHT BAR KNITTING MACHINE
Filed May 29, 1942    11 Sheets-Sheet 1

INVENTORS
George Wilders +
BY William G. Macdonald
ATTORNEY

Dec. 15, 1942.   G. WILDERS ET AL   2,305,335
STRAIGHT BAR KNITTING MACHINE
Filed May 29, 1942   11 Sheets-Sheet 2

INVENTORS
George Wilders +
BY William G. Macdonald
ATTORNEY

Dec. 15, 1942.  G. WILDERS ET AL  2,305,335
STRAIGHT BAR KNITTING MACHINE
Filed May 29, 1942   11 Sheets-Sheet 3

INVENTORS
Geo. Wilders +
BY William G. Macdonald
J.B. Collings
ATTORNEY

Dec. 15, 1942.　　　G. WILDERS ET AL　　　2,305,335
STRAIGHT BAR KNITTING MACHINE
Filed May 29, 1942　　　11 Sheets-Sheet 4
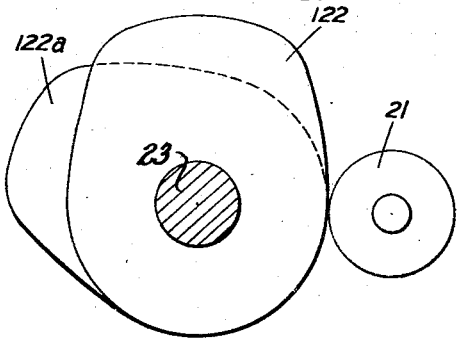
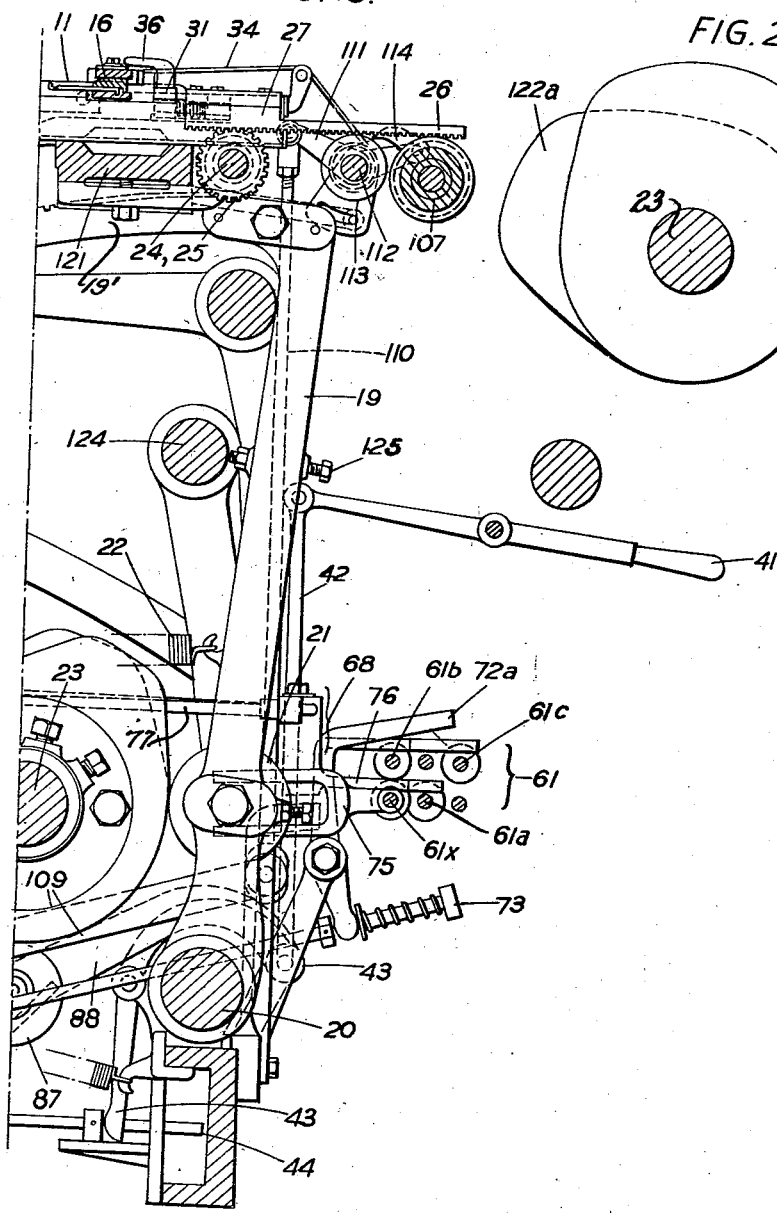
INVENTORS
George Wilders &
BY William G. Macdonald
ATTORNEY.

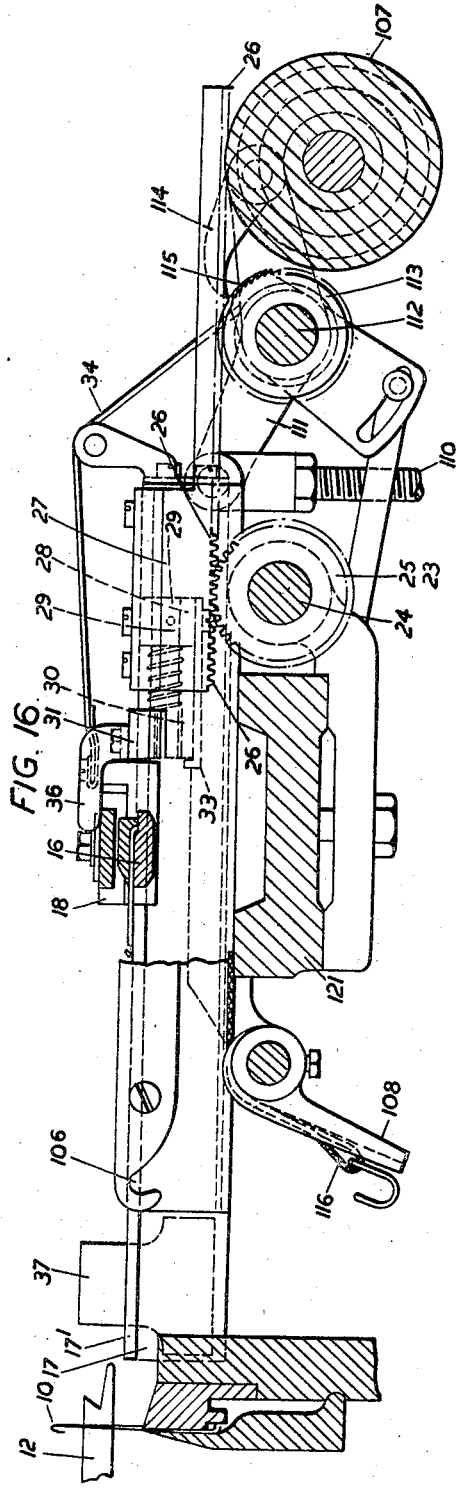

Dec. 15, 1942.  G. WILDERS ET AL  2,305,335
STRAIGHT BAR KNITTING MACHINE
Filed May 29, 1942  11 Sheets—Sheet 7
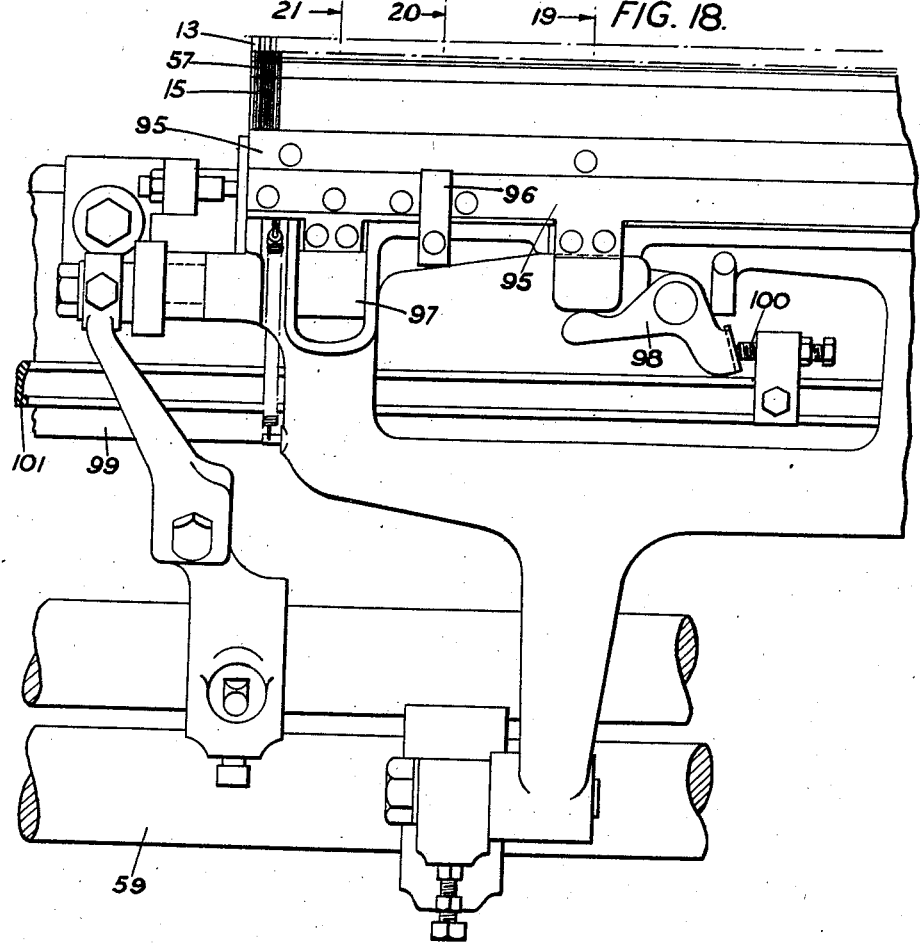
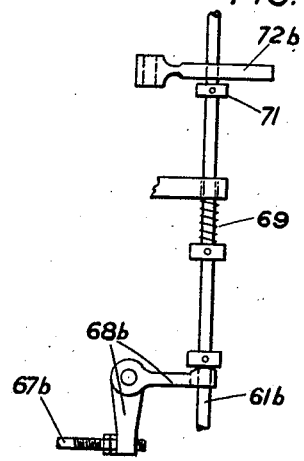
INVENTORS
George Wilders +
BY Wm. G. Macdonald
B M Collings
ATTORNEY Dec. 15, 1942.　　　G. WILDERS ET AL　　　2,305,335
STRAIGHT BAR KNITTING MACHINE
Filed May 29, 1942　　　11 Sheets-Sheet 8
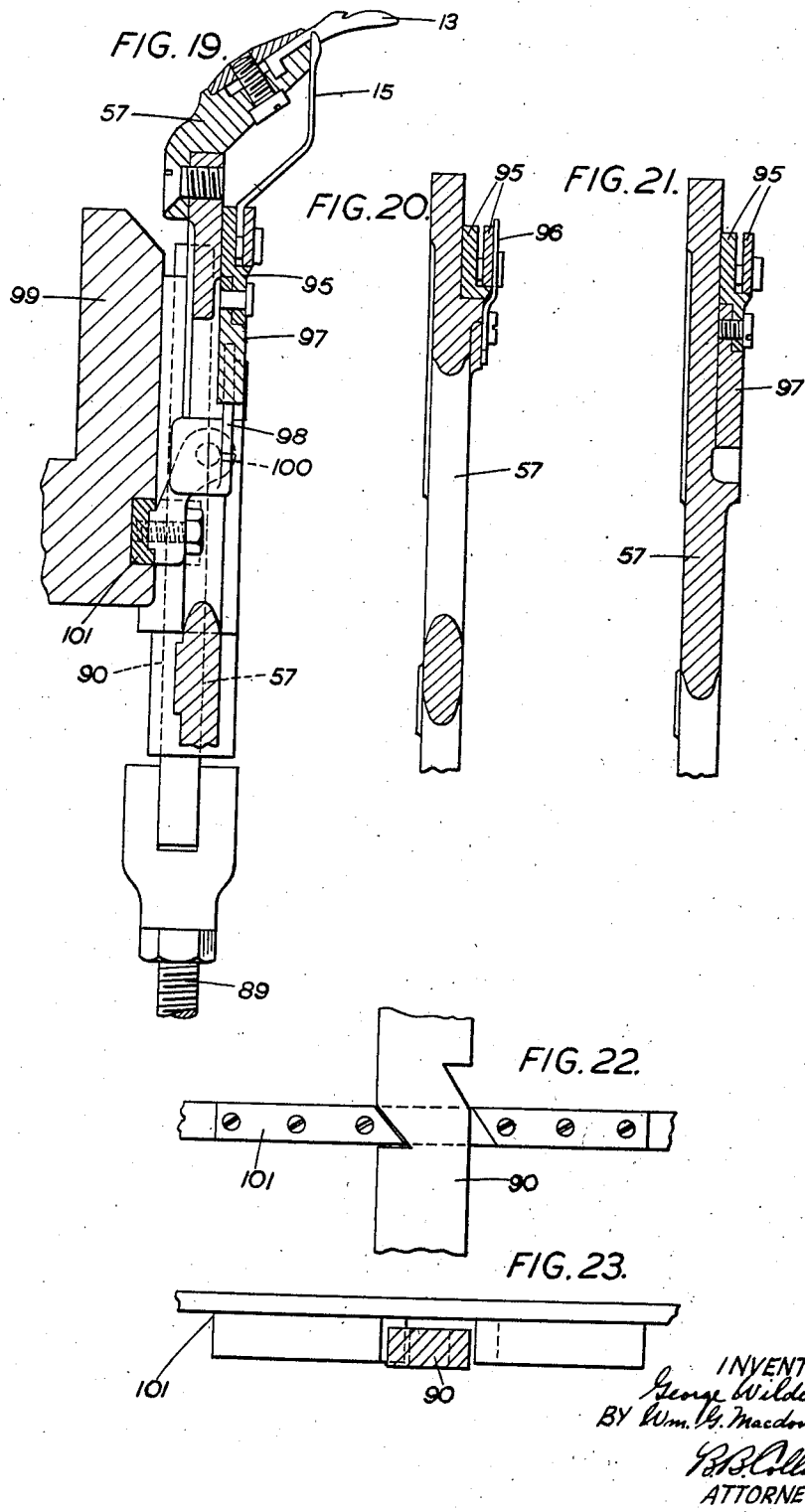

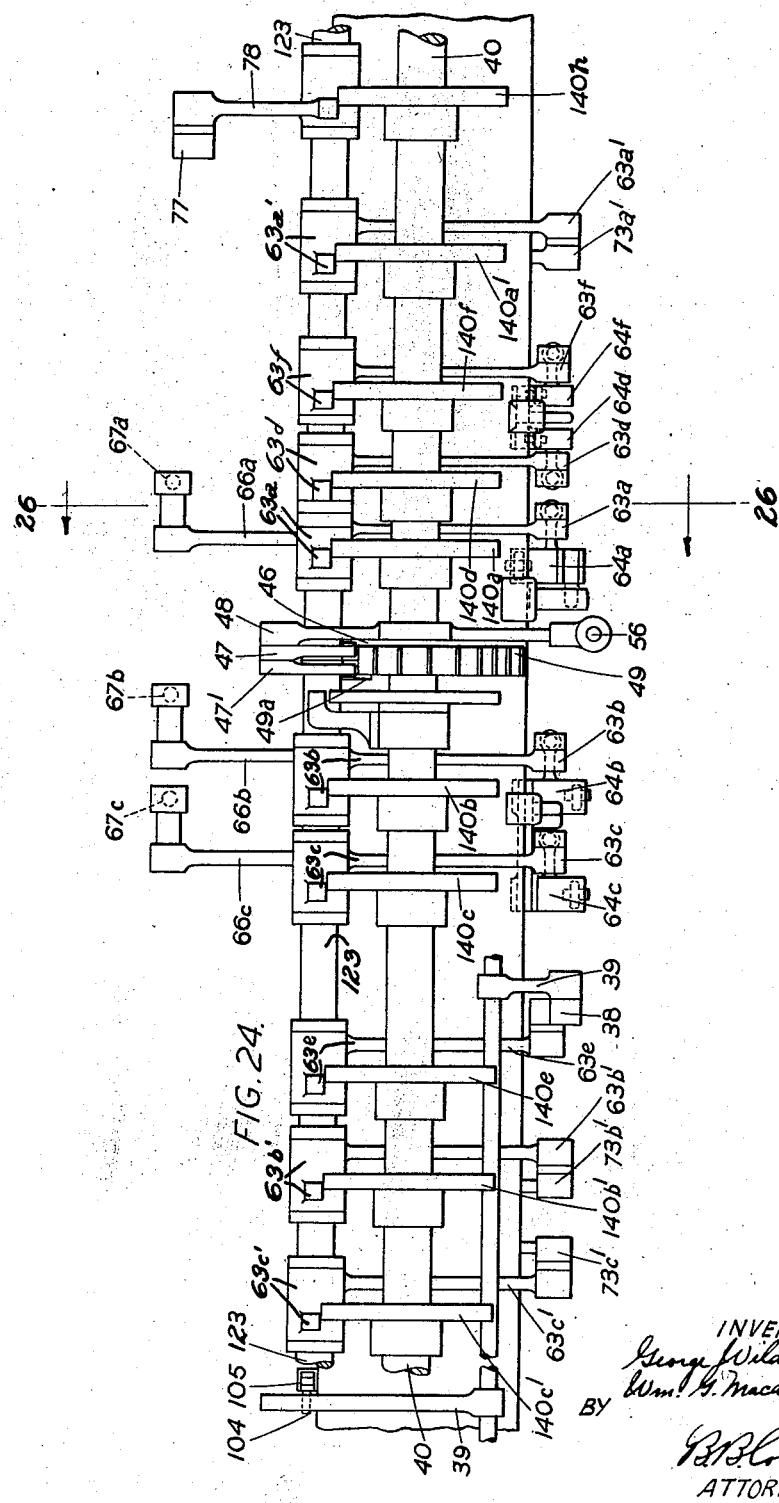

Dec. 15, 1942.  G. WILDERS ET AL  2,305,335
STRAIGHT BAR KNITTING MACHINE
Filed May 29, 1942  11 Sheets-Sheet 10
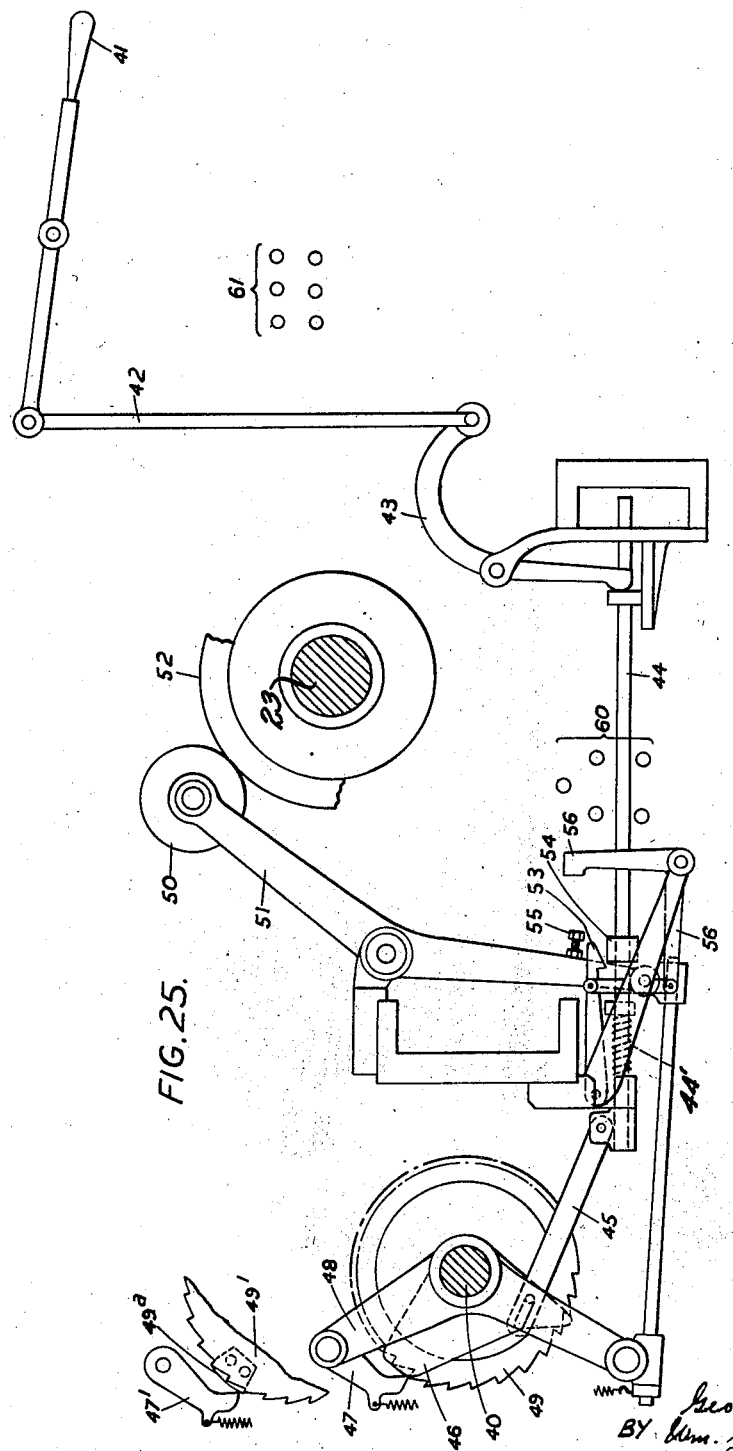

Patented Dec. 15, 1942

2,305,335

UNITED STATES PATENT OFFICE 2,305,335

STRAIGHT BAR KNITTING MACHINE

George Wilders, Kegworth, and William Gordon MacDonald, Loughborough, England, assignors to William Cotton Limited, Loughborough, England Application May 29, 1942, Serial No. 445,044
In Great Britain April 25, 1941

15 Claims. (Cl. 66—96)

This invention is for improvements in and relating to Cotton's patent or other straight bar knitting machine having automatic welt turning apparatus, and an object of the invention is to provide simple means of a mechanical nature whereby the requisite movements are imparted to the welt bar. The invention is particularly but not exclusively applicable to the straight bar knitting machine according to British patents No. 505,222 or No. 501,306.

The present invention provides, in a Cotton's patent or other straight bar knitting machine having automatic welt turning apparatus comprising a welt bar equipped with welting instruments or hooks movable towards the needles to receive thread or thread kinks of an initial welt course, movable away from the needles during the production of at least a portion of the welt, and movable towards the needles to offer to them the initial welt course held by the welting instruments, operating mechanism for effecting the aforesaid movements of the welt bar towards the needles, comprising a rack for moving the welt bar, a driving pinion for the rack, a rocking quadrant for rotating the pinion, cam means on the main cam shaft for rocking the quadrant through the medium of a truck or other cam follower, and means for effecting relative shogging or displacement of said cam means and follower to bring them into and out of co-operative register. Preferably the cam means is arranged to rock the quadrant in one direction and spring means is provided for moving it in the reverse direction under the control of the cam means. According to an important subsidiary feature of the invention the cam means comprises two cams, for moving the welt bar at the commencement and at the termination respectively of the welt, and the truck is arranged to be acted on by each cam in turn (the expression "moving" being employed in a broad sense to include the control of the movements of the bar, as for example when a truck descends a flank of the cam under spring or other influence and the resultant movement of the bar is determined by the configuration of the cam flank).

The foregoing and other features of the invention set out in the appended claims are incorporated in the constructions which will now be described as an example with reference to the accompanying drawings, in which Figures 1–13 are diagrams illustrating the various stages in the production of a turned welt.

Figures 14 and 15 together constitute a cross section showing the relevant parts of a Cotton's patent knitting machine according to this invention.

Figure 16 is a sectional elevation, on a larger scale, showing the welt bar and associated mechanism.

Figure 18 is an elevation showing the pressing points hereinafter referred to.

Figures 19, 20 and 21 are, respectively, cross sections on the lines 19, 20 and 21 of Fig. 18.

Figure 22 is an elevation, and

Figure 23 a sectional plan of part of the operating mechanism for the pressing points.

Figure 24 is a diagrammatic elevation of the disc shaft hereinafter referred to.

Figure 14:
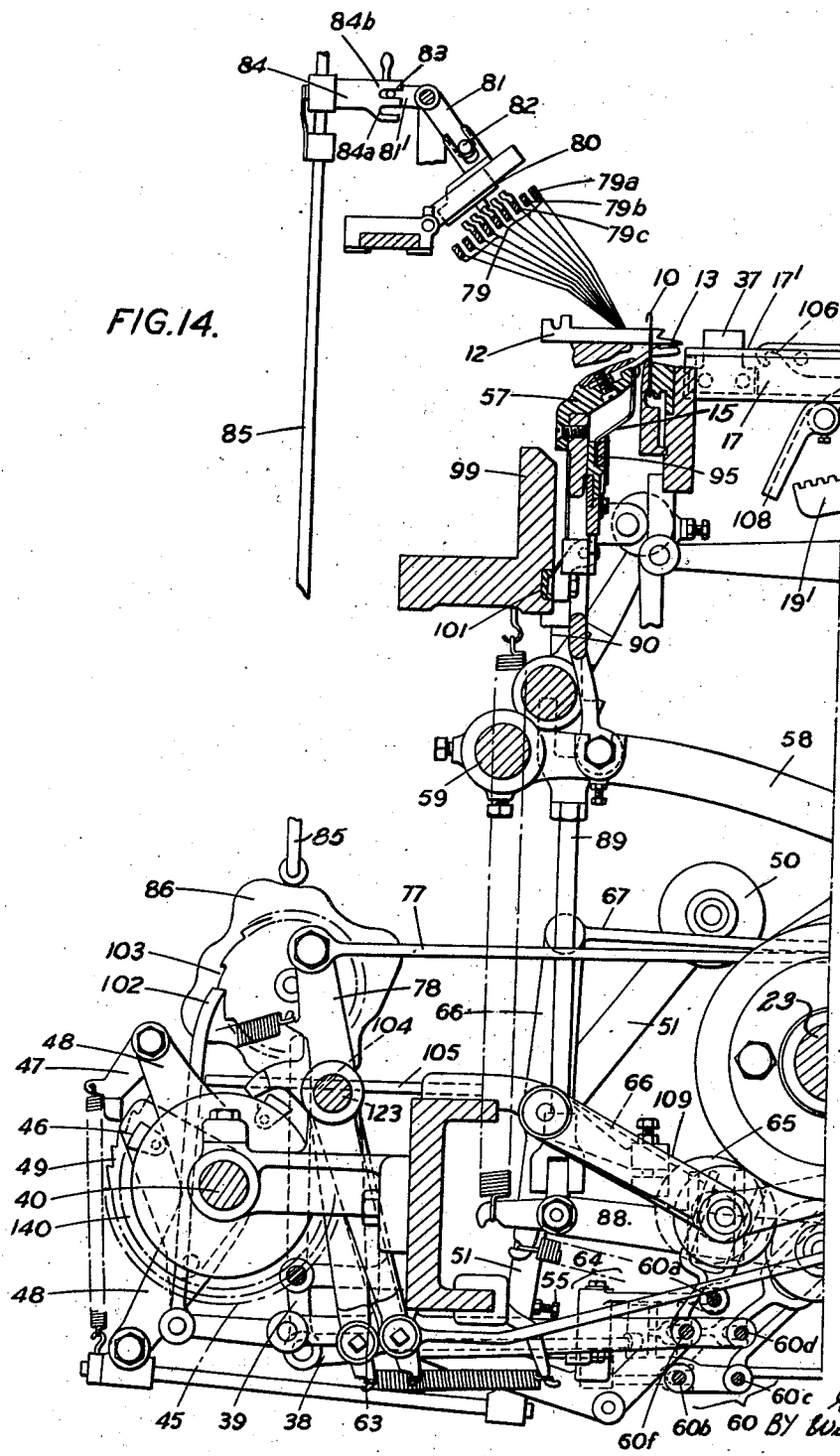
Figure 26:
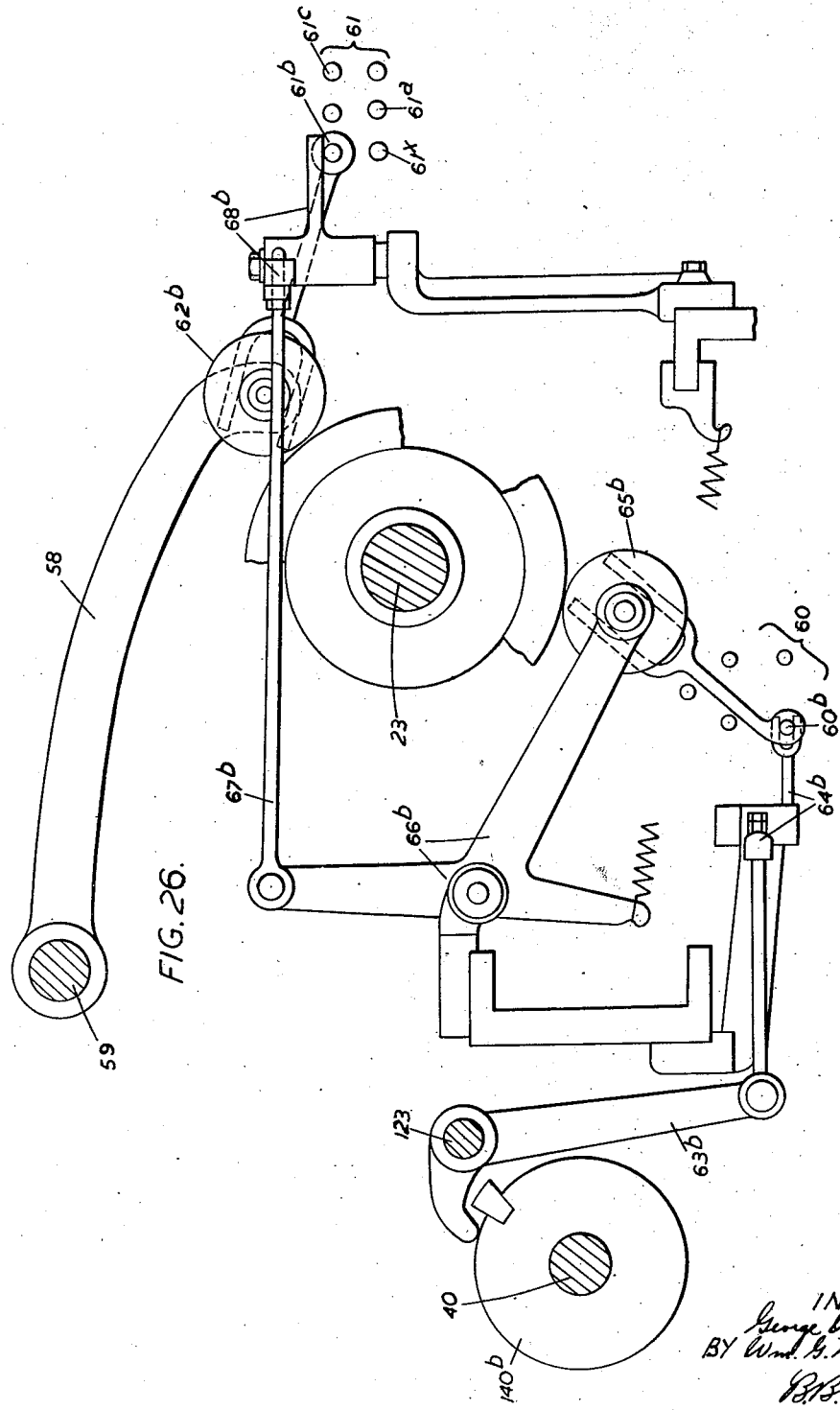

Figure 25 is an elevational view of part of the mechanism shown in Fig. 14 as seen from the left of said figure, and illustrating the disc shaft control and racking mechanism, while Figure 26 is a sectional-elevational view of mechanism included in Figs. 14 and 24, taken approximately on the plane indicated by the line 26—26 of the latter figure, and illustrating, as a representative example, the means whereby selected cam trucks are shogged.

Figure 27 is a detail in plan of mechanism included in Figures 15 and 26, and

Figure 28 shows the cams for moving and controlling the movements of the welt quadrant.

Figure 1:
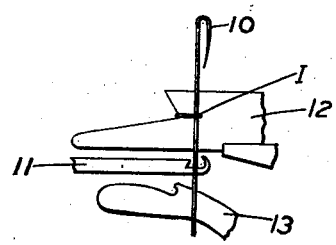
Figure 2:
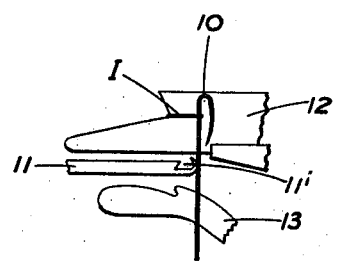
Figure 3:
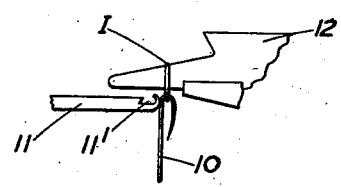
Figure 4:
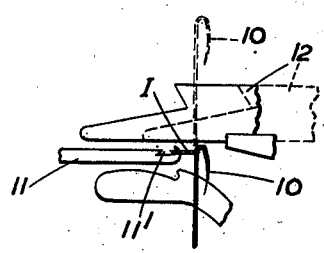
Figure 7:
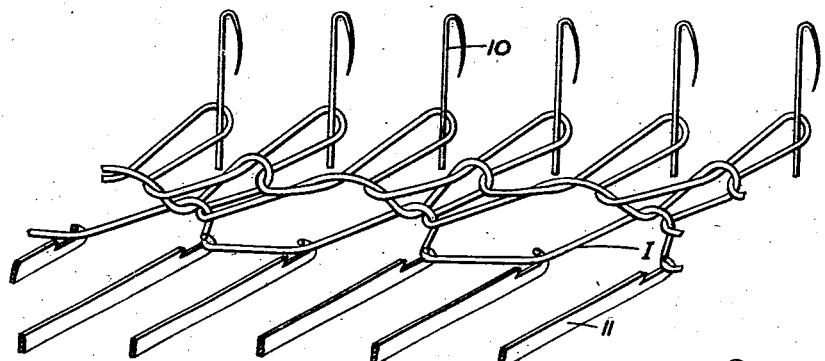
Figure 8:
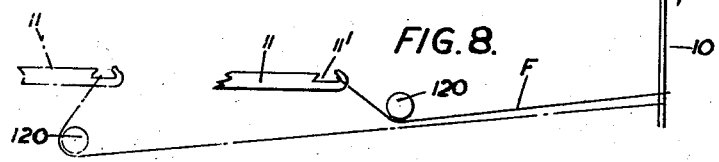
Figure 9:
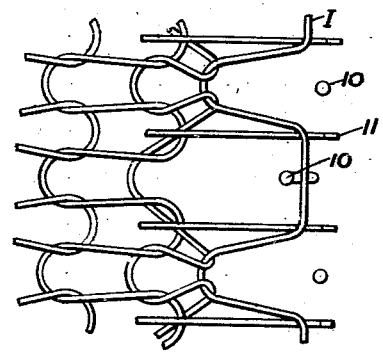
Figure 10:
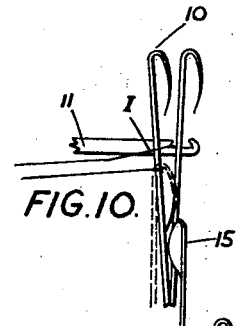
Figure 11:
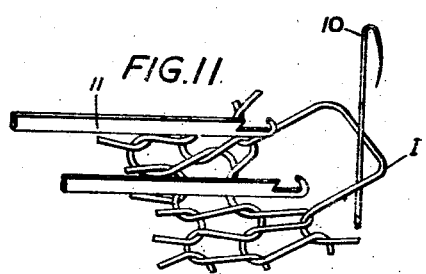
Figure 12:
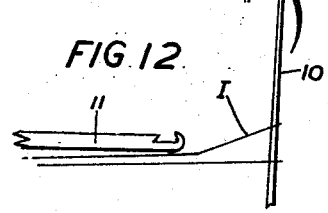
Figure 13:
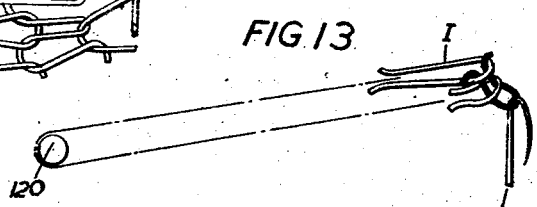

Turning first to Figs. 1–13, the thread of the initial welt course I of a stocking welt is laid, sunk and divided on the needles 10 in the usual manner, but the knocking-over bits 13 are lowered before dividing takes place and welting instruments 11, one for each needle space, are inserted below the sinkers 12 and above the knocking-over bits 13. The construction of these welt instruments is clearly shown; each of them has a hook or recess 11'. The course I having been divided the needles are lowered (Fig. 2) and the sinkers 12 retracted (Fig. 3) so that every sinker loop descends into the hook 11' of the appropriate welting instruments, the sinkers are then again advanced (Fig. 4) and the needles raised. At least one draw (and preferably two takes place without yarn and during such draw or draws every second needle descends and is pressed by a presser bit 15 (Fig. 5) so that on further descent of the needles every second needle kink is cast off to extend between two successive welt hooks 11, Fig. 6. Knitting of the welt thereafter proceeds in the usual manner (Fig. 7) the welt hooks being retracted until at an appropriate stage the welt rod 120 is inserted above the welt fabric F and the take-up straps attached to it so that a fold of the fabric is drawn below the welt hooks 11 as shown in the chain dotted lines (Fig. 8) and the initial course is drawn to the back of the hooks 11'. When the requisite length of fabric has been knitted the welting instruments 11 are again advanced to offer the needle kinks held by them to be transfixed by the needles. In order to facilitate this the presser instruments 15 are again brought into operation to press every second needle, from which a needle kink was originally cast off, in the forward direction (i. e., towards the front of the machine) as shown in Figs. 9 and 10, so that when the needles thereafter rise (Fig. 11) they pass through the needle kinks held by pairs of welting instruments without difficulty. Welting instruments 11 are then withdrawn (Fig. 12) and knitting proceeds as in Fig. 13, take-up being effected through the welt rod 120.

The welting instruments 11, which extend horizontally, are carried by a welt bar 16 (identified by the reference numeral 3 in the specifications of the aforesaid British patents) there being one such bar for each division in the case of a multi-division machine. Each end of the said welt bar is mounted, to slide in a horizontal plane to and from the needles, on a guide 17 (Figs. 14, 15 and 16) supported on frame member 121. Each of the guides is of U or channel shape in section and the upper margins of its side walls are flanged outwards as at 17' to be embraced by suitable parts on a box-like member 18 on which the adjacent end of the welt bar 16 is mounted.

Figure 17:
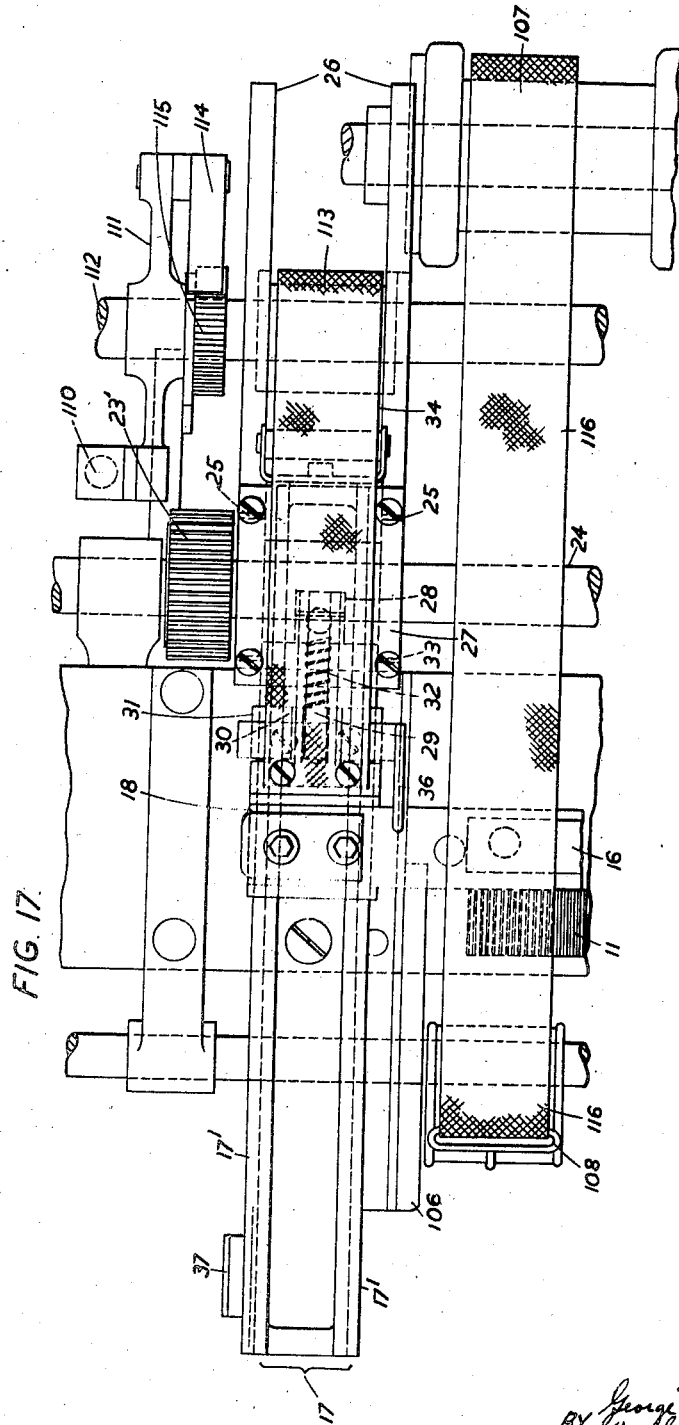
Figure 17 is a plan thereof.

The welt bar is propelled towards the needles by rack and pinion mechanism best shown in Figs. 15, 16 and 17. There is a rocking quadrant 19 pivoted at 20 and having a truck 21 which is urged by a tension spring 22 to engage with cams on the main cam shaft 23, the said truck being shogged from an idle position into register with one or other of two cams and vice versa by mechanism hereinafter described. The upper end of this quadrant is a toothed part 19' which engages with a pinion 23' on a shaft 24. For each end of a welt bar, this shaft carries two other pinions 25 (Figs. 16 and 17) meshing with racks 26 formed at the underside of a box-like member 27 slidable along the adjacent guide 17 (as it may here be pointed out that the pinion that meshes with the toothed quadrant may also mesh with the rack). The box member 27 carries a depending block 28 between the side walls of the guide 17, which block in turn supports a forwardly projecting pin 29. The front end of the latter is slidably engaged in a further block 30 depending from a box member 31 likewise slidable along the guide 17, and between the two depending blocks 28 and 30 the pin 29 is encircled by a compression spring 32. Therefore when the quadrant 19 is swung towards the front of the machine the welt bar is resiliently propelled towards the needles through the medium of box members 27, 31, with their blocks 28, 30 and the compression springs 32, but when the quadrant 19 is moved in the other direction the box 27 and block 28 are retired from the needles drawing with them the block 30 and box 31 through the medium of hooked coupling members 33, which boxes 27, 31 therefore recede from the welt bar 16, the latter at this stage being held forward by the engagement course of yarn with the welt hooks. The welt bar is, however, resiliently biased away from the line of needles by welt straps 34.

The parts 36 and 37 are for positioning the welt bar and for holding it rigid during the production of the first course of the welt.

The various operations of the welt turning mechanism are controlled from discs mounted on a disc shaft 40 at the rear of the machine. To start the welt, the hand lever 41 (Figs. 15 and 25) is raised and operates through link 42 and bell-crank-lever 43 to push a rod 44 towards the rear of the machine. The said rod is connected by link 45 to a bluff 46 which is rotatable about the disc shaft 40 and is thereupon removed from beneath a clawker 47 which is carried by a rock lever 48. The clawker is therefore free to engage a rack wheel 49. The clawker 47 is constantly racked by means of a truck 50 mounted on a truck lever 51 and operated by cam 52 on the main cam shaft 23. When the rod 44 is pushed towards the back of the machine a collar 54 thereon (Fig. 25) is engaged by pivoted catch 53, until at the end of the first rack an adjustable stud 55 on the truck lever 51 strikes and rocks a bell-crank-lever 56 whereby the hooked catch 53 is disengaged so that the bluff 46 returns to bluffing position under the influence of compression spring 44' (Fig. 25) on rod 44. During this first rack, however, the rack wheel 49 is moved sufficiently to displace a bluffing member 49a which is adjustably secured to it from beneath a second clawker 47' which moves with the first clawker 47. Therefore, the disc shaft 40 continues to be racked round one rack at each revolution of the main cam shaft 23 until the bluffing member 49a again passes beneath the pawl 47'.

The automatic control of the welting operations is thus brought into operation, the discs on the disc shaft 40 serving to effect this control by shogging various trucks into and out of register with cams on the main cam shaft 23 through the medium of two groups of control rods, which groups are bracketed at 60 and 61 in Figs. 14, 15, 25 and 26. Referring to Figs. 14 and 24, the discs (indicated generally at 140) operate on a series of levers, pivoted at 123, which are indicated by the general bracket 63; certain of the latter are in turn connected by rods each to one of a series of bell-crank-levers 64 while others are connected to locking fingers 72 hereinafter referred to. In Figure 24 ten discs 140 are shown on the disc shaft 40. Reading from left to right the discs and the operations which they control are as follows:

Disc 140c' controls a locking finger hereinafter referred to, in the control mechanism for the advance of the knocking over bits 13;
Disc 140b' controls a like finger in the control mechanism for the lift of said bits;
Disc 140e controls a carrier selector cam 86 for the production of "ringless" fabric;
Disc 140c controls the advance of the knocking over bits;
Disc 140b controls the lift of said bits;
Disc 140a controls the pressing movements of the needle bar;
Disc 140d controls the pressing points 15;
Disc 140f controls the welt strap;
Disc 140a' controls a locking finger in the control mechanism for the needle pressing.
Disc 140h controls the movements of the welt bar.

The levers 64 (Figs. 24 and 26) move the rods of group 60 and the latter, through the medium of forks, shog trucks. The rods 60a, 60b, 60c are respectively concerned with the control of the needle pressing, the lift of the knock-over bits, and the advance of the latter; they shog trucks indicated generally at 65 (Fig. 14) into and out of register with cams on the main cam shaft 23. These trucks 65 are carried on truck levers 66 so that the latter are thereby rocked and, through connections 67, rock bell-crank-levers 68 (Fig. 15) to move rods 61a, 61b and 61c of group 61. These rods in turn shog trucks of which that indicated at 62b in Fig. 26 is an example. The typical mechanism shown in that figure comes into operation, before the initial welt course has been divided (e. g., while said course is being laid) and before the welting instruments 11 are advanced to the needles, to lower the knocking-over bits 13 carried by knocking-over bar 57. The up and down movements of the knocking-over bar are determined by a truck lever 58 mounted on a rock shaft 59 and carrying a truck 62b for engagement with a suitable cam on the main cam shaft 23. This truck is shogged into and out of register with its cam by power derived from the main cam shaft but the shogging is controlled by the rear disc shaft or control shaft 40. One of the discs 140b, Figs. 24 and 26 thereon serves to rock a lever 63b which operates through bell-crank-lever 64b and control rod 60b of the group 60 to shog the truck 65b, carried by a truck lever 66b into register with a cam on the main cam shaft 23. The truck lever 66b is therefore rocked and by a connection 67b rocks bell-crank-lever 68b which in turn serves to move control rod 61b of the group 61 and to shog the knocking-over truck 62b. The reverse movement of the rod 61b (to remove the truck from the cam) may be delayed until any convenient period in the production of a course by mechanism illustrated in Figs. 14 and 27. The bell-crank-lever 68b is adapted to move the rod 61b against the action of a compression spring 69 located between a suitable abutment and a fixed collar on said rod. This movement carries a collar 71 (Fig. 27), on the rod, past a locking finger 72b which is controlled directly from the disc 140b' on disc shaft 40 by a rod 73b' and one of the groups of levers 63. Therefore, the finger 72b being engaged with collar 71, the rod 61b cannot return under the action of the spring 69 until the finger has been lifted. Similar collars 71 and springs 69 are provided on rods 61a and 61c, so that these rods are also controlled by a finger 72. There are three of these fingers 72 and the mechanism first described with relation to finger 72b is typical of the mechanisms for the other two fingers which derive their movements from disc 140c' and 140d'.

The welt bar 16 is now advanced to the needles by the rocking quadrant 19, the truck 21 being for this purpose shogged into register with the appropriate cam 122 (Fig. 28) by the fork 75 (Fig. 15) and rod 61x of group 61, and is subsequently shogged back into the inoperative position. The rod 61x is controlled directly from the disc 140h on disc shaft 40 by bell-crank-lever 76, connection 77 (Figs. 14 and 24) and lever 78 which latter is pivoted at 123. It will be understood that the quadrant 19 moves to the left under the influence of spring 22 after the truck 21 has been shogged to its inoperative position, so that the members 27 and 31 move away from the welt bar 16, but the latter is drawn after them progressively as knitting proceeds by the welt straps 34.

Figure 5:
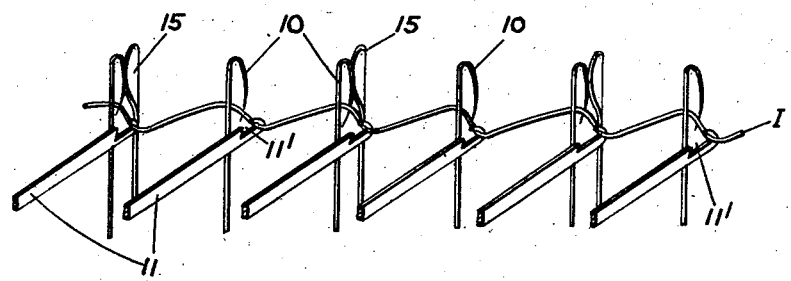
Figure 6:
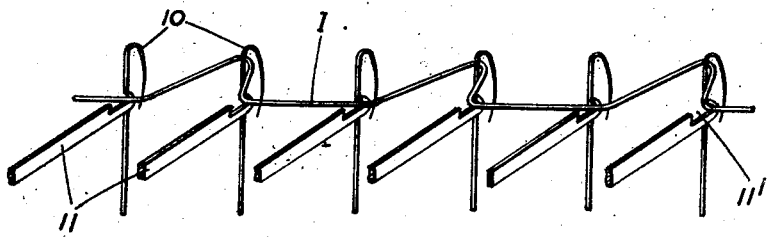

The next course is or the next two courses are made without yarn in order to permit the pressing off of every second needle as shown in Figs. 5 and 6. The carrier bars are grouped under the bracket 79 in Fig. 14 and are selected by a selector 80 moved by levers 81 carrying a rod 82. An arm 81' connected to one of these levers is provided with a pin 83 which may be engaged in either of two slots 84a or 84b in a member 84 which is pivotally carried on the top of a vertical rod 85. The member 84 is turned by hand and the pin 83 is engaged in the lower slot 84a thereof. This restricts the selector 80 to positions equivalent to the three carrier bars 79a, 79b and 79c whereof the bars 79a and 79b are not provided with lugs for engagement by the selector 80 and are therefore incapable of being traversed. The up and down movement of the rod 85 is controlled by a carrier selecting cam 86 and the "neutral" position equivalent to bar 79a is selected for the aforesaid course. All the needles are prevented from pressing on the usual presser, the presser truck being shogged on to an additional cam for this purpose. The presser truck is controlled from disc 140a by shogging one of the trucks 65 (Fig. 26) and the said truck is controlled by rods 60a, 61a, and connections similar to those by which rod 60b is moved. Therefore, Fig. 26 is an example of the presser control mechanism.

The auxiliary pressing points 15 are now raised to meet the needles in their descent (Figs. 5 and 6) by shogging the presser point truck 87 (Fig. 15) from an inoperative position into register with a cam by means of rod 69d (Fig. 14) which rod is itself moved by controls (including disc 140d) similar to those of rod 60b. The truck 87 is carried by lever 88 to which is coupled a vertical rod 89 and a cam slide 90 (Figs. 14 and 19) which operates in a manner hereinafter described. The presser points 15 are carried by a bar, indicated generally at 95, which is secured to the knocking-over bar 57 by members 96 (see Figs. 18 and 20) and is slidably guided on the bar 57 by slide members 97. It is arranged to be raised thereon by means of a bell-crank-lever 98 secured to the knocking-over bar 57 and co-operating with an adjustable tappet 100 itself carried by a bar 101 slidable horizontally in the frame member 99. Slide 90 is cut and bar 101 is constructed as shown in Figs. 22 and 23 so that when the slide 90 is lowered the bar 101 is moved horizontally to cause the pressers 15 to be raised.

With the lowering and raising of the needles shown in Figs. 5 and 6 the initial course has been transferred to the hooks 11, but it will be remembered that the two draws or "courses" following the initial course are completed without yarn to permit the needles to be pressed by the points 15 and the loops cast off. For the second of these two idle courses a position equivalent to carrier bar 79b (Fig. 14) is selected, the pressing points 15 are lowered and their truck 87 (Fig. 15) shogged back, the needle bar pressing truck is shogged back and the knocking-over bits 13 are restored to the operative position by shogging their truck, the movements of these trucks having hitherto been delayed by fingers 72. At the end of the course the selector 80 is stopped in a position in which the welt carrier bar 79c (the carrier of which is threaded up with yarn) is selected. The carrier selector cam 86 (Fig. 14) is stopped from rotation by disengaging its racking pawl 102 from its rack wheel 103. This is effected when one (63e) of the levers 63, connected to lever mechanism 39 by link 38 (Figs. 14 and 24), drops off a stud on the appropriate disc 140e and allows a pin 104 and a rod 105 to slide under the influence of a spring and to disengage the pawl 102. This pawl 102 is normally racked by any appropriate mechanism, such for example as that disclosed in British patent specification No. 483,040.

When the welt bar 16 has retired to a sufficient extent the welt rod 120 is then slipped into the hooks 106 (Figs. 14 and 16) provided for it at each end of the needle section and the drawing off straps 116, which are connected to the draw-off roller 107 and have hitherto been resting on the anchor plates 108, are connected to the ends of said bar 16 by swinging said plates upwards, and the draw-off weight is applied to the draw-off rollers. The fabric is drawn off by the joint action of the welt straps 34 and the drawing-off straps 116 until the welt bar 16 reaches the box 31 which has been retired by the quadrant 19 to its maximum extent. Thereafter the draw-off roller 107 and the draw-off straps act alone, a loop of the fabric being drawn under the welting instruments 11 and the welt bar 16, as shown in chain dotted lines in Fig. 8.

In order to effect the re-transfer of the initial course of the welt fabric to the needles, the disc shaft 40 is again started (having stopped some time previously) by handle 41. Thereafter the needle presser truck is shogged by rod 60a to prevent the needles pressing at the usual presser; the yarn selector cam 86 is started so that the next draw is made without yarn with the selector at a position equivalent to carrier bar 79b, and the knocking-over bits 13 are lowered by the operation of control rods 60b and 61b and are subsequently advanced by the operation of control rods 60c and 61c. The truck 21 for the welt quadrant 19 is shogged by rod 61x so that the welt bar 16 is advanced to the needles while the latter are at the knocking over position shown in Figs. 10 and 11. The needles rise to penetrate the loops as in Figs. 9, 10, and 11, and as they rise the pressing points 15 (which are advanced with the knocking-over bits 13 and may, if desired, be controlled by rod 60d to rise to a level substantially that of said bits) deflect alternate needles (Figs. 9 and 10) to ensure an efficient transfer. The welting instruments 11 are retracted (Figs. 11 and 12) simultaneously with the raising of the needles when the latter have transfixed the loops, and as they retract a momentary slackening of the tension of the welt straps 34 is effected. To do so, one of the trucks 65, carried by truck lever 109 (Figs. 14 and 15) is shogged by disc 140f and rod 60f from one cam to another; the truck lever is depressed and pulls rod 110 which is connected to pawl-carrying lever 111. The latter therefore makes a limited rocking movement about the axis of the shaft 112 (Fig. 16) carrying the winding rollers 113 for the welt straps 34 and its pawl 114 racks a ratchet 115 on said shaft to turn the said rollers 113 to slack off the straps 34. The said rollers 113 are biased in the winding direction by weights. The next draw takes place without yarn (the selector being at a position equivalent to carrier bar 79a) to return the machine controls to normal, the carrier selection mechanism being then set to operate on carrier bars 79 other than the bars 79a, 79b, 79c. For example in each of a recurrent series of three successive courses a different bar may be employed as in the production of the so-called "ringless" hose.

The cams for the welt quadrant 19 are illustrated in Fig. 28. There are two shaped cams 122, and 122a, and the welt truck 21 is shogged axially to bring it into register with one or other of the said two cams 122, 122a on the main cam shaft 23 and also into a third, inoperative, position in which it does not register with either of them. The cam 122 is employed to move the welt bar 16 towards the needles to take the initial welt course and then away from the needles, and the other cam 122a is employed to move the welt bar towards the needles to restore the initial welt course at the completion of the welt. The cams are appropriately shaped and set on the cam shaft as to give the required timing, and the spring 22 (Fig. 15) is provided for holding the truck 21 against the periphery of the cams.

The design of the shaped cams 122, 122a is such that the welt bar 16 is caused to make a movement towards and away from the needles in a complete revolution of the main cam shaft 23. The automatic production and turning of a welt necessitates the following movements of the welt bar: (a) towards the needles to receive the initial course, (b) away from the needles during the production of the first few courses of the welt, (c) towards the needles at the completion of the welt to offer the initial course to them, and (d) away from the needles to an inoperative position after the welt has been turned. Since it is necessary that the welt bar should remain stationary between movements (b) and (c) while the welt fabric is being knitted and taken up by the usual welt rod 120 and take-up straps 116, it will be obvious that not only must the truck 21 be shogged into register with the appropriate cam at the commencement of the welt turning operations and out of register at their termination, but that it must also be shogged from cam 122 to the inoperative position before movement (b) and from the inoperative position to the other cam 122a prior to movement (c).

In order to facilitate shogging, the quadrant 19 is provided with an adjustable screw 125 which comes into contact with any suitable stop, such for example as one of the shafts 124 of the machine, and keeps the truck 21 just clear of the low portions of the cam peripheries.

It will be obvious that the disc shaft 40 may be started automatically, by any suitable control or chain, instead of or in addition to the hand lever 41.

We claim:

1. In a Cotton's patent or other straight bar knitting machine having automatic welt turning apparatus comprising a welt bar equipped with welting instruments or hooks movable towards the needles to receive thread or thread kinks of an initial welt course, movable away from the needles during the production of at least a portion of the welt, and movable towards the needles to offer to them the initial welt course held by the welting instruments; operating mechanism for effecting the aforesaid movements of the welt bar towards the needles, comprising a rack for moving the welt bar, a driving pinion for the rack, a rocking quadrant for rotating the pinion, a cam follower associated with the quadrant, cam means for rocking the quadrant through the medium of the follower, and means for effecting relative shogging or displacement of said cam means and follower to bring them into and out of co-operative register.

2. A machine according to claim 1, having the cam means for rocking the quadrant in one direction and spring means for rocking it in the reverse direction.

3. A machine according to claim 1, wherein the cam means comprises two cams for acting on the follower in turn: one for moving the welt bar at the commencement and the other at the termination of the welt.

4. In a Cotton's patent or other straight bar knitting machine having automatic welt turning apparatus comprising a welt bar equipped with welting instruments or hooks movable towards the needles to receive thread or thread kinks of an initial welt course, movable away from the needles during the production of at least a portion of the welt, and movable towards the needles to offer to them the initial welt course held by the welting instruments; operating mechanism for effecting the aforesaid movements of the welt bar towards the needles, comprising a rack for moving the welt bar, a driving pinion for the rack, a rocking quadrant for rotating the pinion, a cam follower associated with the quadrant, two main shaft cams for acting on the follower to rock the quadrant to advance the welt bar towards the needles, one cam for advancing the welt bar to the needles to take the initial course and the other to advance the welt bar to the needles in the restoration of the welt, means for retracting the welt bar from the needles, and shogging means for effecting relative shogging between the follower and cams.

5. In a Cotton's patent or other straight bar knitting machine having automatic welt turning apparatus comprising a welt bar equipped with welting instruments or hooks movable towards the needles to receive thread or thread kinks of an initial welt course, movable away from the needles during the production of at least a portion of the welt, and movable towards the needles to offer to them the initial welt course held by the welting instruments; operating mechanism for effecting the aforesaid movements of the welt bar towards the needles, comprising a rack for moving the welt bar, a driving pinion for the rack, a rocking quadrant for rotating the pinion, a cam follower associated with the quadrant, a main shaft cam for acting on the follower to rock the quadrant in one direction to advance the welt bar to the needles to take the initial course, a second main shaft cam for acting on the follower to rock the quadrant in said direction to advance the welt bar to the needles in the restoration of the welt and to control the subsequent retirement of the welt bar, means, other than the quadrant, for retiring the welt bar from the needles, and shogging means for effecting relative shogging between the follower and cams to bring the follower and first cam into register to advance the welt bar to the needles and out of register prior to a second rotation of the cam and to bring the follower and second cam into register to advance the welt bar and subsequently out of register.

6. In a Cotton's patent or other straight bar knitting machine having automatic welt turning apparatus comprising a welt bar equipped with welting instruments or hooks movable towards the needles to receive thread or thread kinks of an initial welt course, movable away from the needles during the production of at least a portion of the welt, and movable towards the needles to offer to them the initial welt course held by the welting instruments; operating mechanism for effecting the aforesaid movements of the welt bar towards the needles, comprising a rack for moving the welt bar, a driving pinion for the rack, a rocking quadrant for rotating the pinion, a cam follower associated with the quadrant, a main shaft cam for acting on the follower to rock the quadrant in one direction to advance the welt bar to the needles to take the initial course, a second main shaft cam for acting on the follower to rock the quadrant in said direction to advance the welt bar to the needles in the restoration of the welt and to control the subsequent retirement of the welt bar, means, other than the quadrant, for retiring the welt bar from the needles, and shogging means for effecting relative shogging between the follower and cams to bring the follower and first cam into register to advance the welt bar to the needles and out of register prior to a second rotation of the cam and to bring the follower and second cam into register to advance the welt bar and out of register after the welt bar has retired from the needles under the control of said cam.

7. In a Cotton's patent or other straight bar knitting machine having needles and automatic welt turning apparatus comprising a welt bar, equipped with welting instruments, movable towards the needles to receive thread or thread kinks of an initial welt course, away from the needles during the production of at least a portion of the welt, and towards the needles to offer to them the initial course held by the instruments; the combination of a rack, movable separately from the welt bar, for advancing the bar to the needles, a rocking quadrant for moving the rack towards the needles to advance the welt bar, a cam follower associated with the quadrant, cam means for acting on the follower to rock the quadrant and to move the rack, shogging means for effecting relative shogging between the follower and cam means to bring them into and out of co-operating register, and a take-up for retiring the welt bar from the needles independently of the movement of the rack.

8. In a Cotton's patent or other straight bar knitting machine having needles and automatic welt-turning apparatus comprising a welt bar, with a welting instrument thereon for each needle space, movable towards the needles for the instruments to receive needle kinks of an initial course, away from the needles during the production of at least a portion of the welt, and towards the needles to offer to them the initial course held by the instruments, and means for releasing from every second needle the needle kinks of the initial course so that, prior to the production of the next course of the welt, the thread of each such kink extends between two successive instruments; the combination of a rack, movable separately from the welt bar, for advancing the welt bar to the needles, a rocking quadrant for moving the rack, a cam follower associated with the quadrant, cam means for acting on the follower to rock the quadrant to advance the welt bar to the needles at the commencement of the welt and at the termination of the welt, shogging means for effecting relative shogging between the follower and cam means to bring them into and out of co-operating register, timing means for rendering the release means operative when the welt bar has been advanced by the cam means at the commencement of the welt, and means other than the quadrant for drawing the welt bar away from the needles after the initial course has been taken by the instruments.

9. In a Cotton's patent or other straight bar knitting machine having needles and automatic welt-turning apparatus comprising a welt bar, with a welting instrument thereon for each needle space, movable towards the needles for the instruments to receive needle kinks of an initial course, away from the needles during the production of at least a portion of the welt, and towards the needles to offer to them the initial course held by the instruments, and needle pressing means for releasing from every second needle the needle kinks of the initial course so that, prior to the production of the next course of the welt, the thread of each such kink extends between two successive instruments; the combination of a rack, movable separately from the welt bar, for advancing the welt bar to the needles, a rocking quadrant for moving the rack, a cam follower associated with the quadrant, cam means for acting on the follower to rock the quadrant to advance the welt bar to the needles at the commencement of the welt and at the termination of the welt, shogging means for effecting relative shogging between the follower and cam means to bring them into and out of co-operating register, timing means for rendering the pressing means operative when the welt bar has been advanced by the cam means at the commencement of the welt, and means other than the quadrant for drawing the welt bar away from the needles after the initial course has been taken by the instruments.

10. In the combination claimed in claim 1, a rack at each end of the welt bar, a pinion shaft, and two quadrant-driven pinions, fixed to said shaft, each engaging one of the racks.

11. A Cotton's patent or other straight bar knitting machine, having welt turning apparatus comprising a welt bar equipped with welting instruments, which welt bar is movable towards the needles at the commencement of the welt to receive thread of an initial welt course on the instruments, away from the needles during the production of at least a portion of the welt to take up the fabric under production, towards the needles at the termination of the welt to offer the initial welt course to the needles, and finally away from the needles, in combination with a rack separate from, and movable from the needles independently of, the welt bar for propelling the bar towards the needles, a pinion engaging said rack, a rocking quadrant for rotating the pinion, a cam on the main cam shaft for rocking the quadrant to propel the rack towards the needles, spring means for rocking the quadrant to retire the rack from the needles, and welt straps for drawing the welt bar away from the needles.

12. In the combination claimed in claim 11, drawing-off straps for attachment to a welt rod, tensioning means for the welt straps, and means for effecting a momentary slackening of tension on the welt straps as the needles transfix the initial course in its restoration to them.

13. In a Cotton's patent or other straight bar knitting machine having needles and automatic welt turning apparatus comprising a welt bar, equipped with welting instruments, movable towards the needles to receive thread or thread kinks of an initial welt course, away from the needles during the production of at least a portion of the welt, and towards the needles to offer to them the initial course held by the instruments; the combination of a guide for each end of the welt bar in its movements, members, separate from the welt bar, mounted on the guides for propelling the welt bar towards the needles but movable away from the needles independently of the welt bar, at least one rack connected to the said members, a rocking quadrant driving said rack and members, a cam follower associated with the quadrant, cam means for engaging the follower to rock the rack, shogging means for effecting relative shogging between the follower and cam means to bring them into and out of co-operative register, and means other than the said members and rack for moving the welt bar along the guides away from the needles.

14. In a Cotton's patent or other straight bar knitting machine having automatic welt turning apparatus comprising a welt bar equipped with welting instruments or hooks movable towards the needles to receive thread or thread kinks of an initial welt course, movable away from the needles during the production of at least a portion of the welt, and movable towards the needles to offer to them the initial welt course held by the welting instruments; operating mechanism for the welt bar, comprising a rack for moving the welt bar, a rocking quadrant for moving the rack, a cam follower associated with the quadrant, cam means for rocking the quadrant through the medium of the follower, and means for effecting relative shogging or displacement of said cam means and follower to bring them into and out of co-operative register.

15. In a Cotton's patent or other straight bar knitting machine having automatic welt turning apparatus comprising a welt bar equipped with welting instruments or hooks movable towards the needles to receive thread or thread kinks of an initial welt course, movable away from the needles during the production of at least a portion of the welt, and movable towards the needles to offer to them the initial welt course held by the welting instruments; operating mechanism for effecting the aforesaid movements of the welt bar towards the needles, comprising a rack for moving the welt bar, a driving pinion for the rack, a rocking quadrant for rotating the pinion, a cam follower associated with the quadrant, two main-shaft cams for co-acting with the follower and quadrant, one cam in the advance of the welt bar to the needles to take the initial course and the other in the advance of the bar to the needles to offer to them the initial welt course held by the welting instruments, means for retracting the welt bar from the needles, and shogging means for effecting relative shogging between the follower and cams.

GEORGE WILDERS.
WILLIAM G. MACDONALD.